(12) United States Patent
Moon et al.

(10) Patent No.: US 9,148,051 B2
(45) Date of Patent: Sep. 29, 2015

(54) SWITCH CONTROL DEVICE AND CONVERTER INCLUDING THE SAME

(75) Inventors: Sang-Cheol Moon, Bucheon (KR); Hang-Seok Choi, Gunpo (KR); Young-Bae Park, Anyang (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 483 days.

(21) Appl. No.: 12/497,261

(22) Filed: Jul. 2, 2009

(65) Prior Publication Data

US 2010/0002474 A1 Jan. 7, 2010

(30) Foreign Application Priority Data

Jul. 7, 2008 (KR) .................. 10-2008-0065536

(51) Int. Cl.
*H02M 5/42* (2006.01)
*H02M 1/42* (2007.01)

(52) U.S. Cl.
CPC ............ *H02M 1/4225* (2013.01); *Y02B 70/126* (2013.01)

(58) Field of Classification Search
USPC ......... 363/16, 18, 21.01, 21.06, 21.14, 21.18, 363/84, 98, 90, 97; 323/207, 222, 271, 323/282–285
See application file for complete search history.

(56) References Cited

U.S. PATENT DOCUMENTS

| 5,289,361 | A | 2/1994 | Vinciarelli |
| 5,349,284 | A | 9/1994 | Whittle |
| 5,406,192 | A | 4/1995 | Vinciarelli |
| 5,982,641 | A * | 11/1999 | Jackson ............... 363/21.12 |
| 7,795,854 | B2 * | 9/2010 | Xia et al. ............... 323/283 |
| 2006/0022658 | A1 * | 2/2006 | Harriman et al. ......... 323/284 |
| 2009/0146627 | A1 * | 6/2009 | Xia et al. ............... 323/282 |

OTHER PUBLICATIONS

FAN7528; "*Dual-Output, Critical Conduction Mode PFC Controller;*" © 2005 Fairchild Semiconductor Corporation; Feb. 2007.
Cherl-Jin Kim, et al.; "A Study on the stability of boost power factor correction circuit with voltage feedback loop"; Nov. 14-16, 2002; pp. 271-273.

* cited by examiner

*Primary Examiner* — Nguyen Tran
(74) *Attorney, Agent, or Firm* — Alston & Bird LLP (57) ABSTRACT

The present invention relates to a switch controller and a converter having the same. The converter according to the present invention includes a power transfer device that transmits input power to an output terminal as output power, a power switch connected to a first end of the power transfer device and that controls power transmission of the power transfer device, and a switch controller that controls switching operation of the power switch. The switch controller receives an output voltage detection signal corresponding to an output voltage according to the power transmitted from the power transfer device, generates a duty control signal corresponding to a difference between the output voltage detection signal and a reference signal for controlling the output voltage, and determines turn-on/off of the power switch by using the duty control signal, and a DC gain of a feedback transfer function between the reference signal and the output voltage has a constant value.

14 Claims, 6 Drawing Sheets

SWITCH CONTROL DEVICE AND CONVERTER INCLUDING THE SAME

CROSS-REFERENCE TO RELATED APPLICATION

This application claims priority to and the benefit of Korean Patent Application No. 10-2008-0065536 filed in the Korean Intellectual Property Office on Jul. 7, 2008, the entire contents of which are incorporated herein by reference.

BACKGROUND OF THE INVENTION (a) Field of the Invention

The present invention relates to a switch controller and a converter having the same. In further detail, it relates to a switch controller that can compensate efficiency deterioration according to an input voltage of a converter, and a converter having the same.

(b) Description of the Related Art

In general, when forming a power factor controller (PFC) circuit with a converter, a method (hereinafter referred to as a multi-input method) that controls a level of an output voltage to be changed according to an input voltage is advantageous in efficiency of the converter compared to a method that maintains an output voltage in a constant level. A slope at which an input current is decreased when a switch of the converter is turned off is proportional to a difference between the output voltage and the input voltage. When the input voltage is decreased so that the output voltage is decreased, the difference between the output voltage and the input voltage is decreased compared to the case in which the output voltage is maintained at a constant level. Then, the input current decreasing slope is decreased and thus a switching operation period of the switch is increased so that a switching loss is decreased. In addition, since the output voltage is decreased, a duty of the switch is decreased so that a conduction loss is also decreased. Accordingly, efficiency of a converter using the multi-output method is increased.

In general, the converter generates a reference voltage to determine a duty of a switch that controls operation of the converter. The converter using the multi-output method senses an input voltage and generates a reference voltage according to the input voltage, or senses an output voltage and generates a reference voltage according to an input voltage. As described, the converter using the multi-output method requires an additional configuration for sensing an input voltage or an output voltage to generate a reference voltage.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a switch controller having an advantage of generating a reference voltage according to an input voltage without an additional configuration, and a converter having the same.

A switch controller according to an exemplary embodiment of the present invention controls switching operation of a power switch that controls power transmission of a power transfer device that transmits input power to an output terminal. The switch controller includes a feedback information generator and a duty determining unit. The feedback information generator receives an output voltage detection voltage corresponding to an output voltage according to power transmitted from the power transfer device, and generates a duty control signal that corresponds to a difference between the output voltage detection signal and a reference signal for controlling the output voltage. The duty determining unit generates information for determining turn-on/off of the power switch by using the duty control signal. A DC gain of a feedback transfer function between the reference signal and the output voltage of the feedback information generator has a constant value. The feedback information generator includes an error amplifier that amplifies a difference between the output voltage detection signal and the reference signal to generate a signal corresponding to the difference, and a gain compensator connected to the output terminal of the error amplifier and compensating the feedback transfer function gain to control the DC gain of the feedback transfer function to have the constant value. The error amplifier is a transconductance amplifier and the gain compensator includes a first resistor having a first end connected to the output terminal of the error amplifier, a first capacitor having a first end connected to a second end of the first resistor and a second end being grounded, and a second capacitor having a first end connected to the first end of the first resistor and being grounded.

In cases in which the error amplifier is a voltage amplifier, and the gain compensator includes a first resistor of which respective ends are connected to the output terminal and a first input terminal of the error amplifier, a first capacitor of which respective ends are connected to the output terminal and the first input terminal of the error amplifier, and a second resistor and a second capacitor of which a first end is connected to a first end of the second resistor. The second resistor and the second capacitor are connected between the output terminal and the first input terminal of the error amplifier, the reference signal is input to a second input terminal of the error amplifier, and the output signal is input to the first input terminal of the error amplifier.

The switch controller according to the exemplary embodiment of the present invention further includes a PWM controller that turns on the power switch according to a time point at which no more current flows to the power transfer device. The PWM controller turns off the power switch according to information input from the duty determining unit. The duty determining unit includes a sawtooth wave generator that generates a sawtooth wave signal having a predetermined period and a comparator to which the duty control signal and the sawtooth wave signal are input, and turns off the power switch when the sawtooth wave signal reaches the duty control signal. The switch controller further includes a zero current detection unit that detects the time point at which no more current flows to the power transfer device, and controls the PWM controller to turn on the power switch after a delay of a predetermined time period from the detected time point.

A converter according to another exemplary embodiment of the present invention includes a power transfer device that transmits input power to an output terminal as output power, a power switch connected to a first end of the power transfer device and that controls power transmission of the power transfer device, and a switch controller that controls switching operation of the power switch. The switch controller receives an output voltage detection signal corresponding to an output voltage according to the power transmitted from the power transfer device, generates a duty control signal corresponding to a difference between the output voltage detection signal and a reference signal for controlling the output voltage, and determines turn-on/off of the power switch by using the duty control signal, and a DC gain of a feedback transfer function between the reference signal and the output voltage has a constant value. The switch controller includes a feedback information generator and a duty determining unit. The feedback information generator receives an output voltage detection signal corresponding to an output voltage according to power transmitted from the power transfer device, and generates a duty control signal corresponding to a difference between the output voltage detection signal and the reference signal for controlling the output voltage. The duty determining unit generates information for determining turn-on/off of the power switch by using the duty control signal. The feedback information generator includes an error amplifier that amplifies a difference between the output voltage detection signal and the reference signal to generate a signal corresponding to the difference between the two signals and a gain compensator connected to an output terminal of the error amplifier, and compensating the feedback transfer function gain to control the DC gain of the feedback transfer function to have a constant value.

The error amplifier is a transconductance amplifier, and the gain compensator includes a first resistor having a first end connected to the output terminal of the error amplifier, a first capacitor having a first end connected to a second end of the first resistor and a second end being grounded, a second capacitor having a first end connected to the first end of the first resistor and a second end being grounded, and a second resistor having a first end connected to the first end of the first resistor and a second end being grounded.

The converter further includes a PWM controller turning on the power switch according to a time point at which no more current flows to the power transfer device, and the PWM controller turns off the power switch according to information input from the duty determining unit.

The duty determining unit includes a sawtooth wave generator that generates a sawtooth wave signal having a predetermined period and a comparator to which the duty control signal and the sawtooth wave signal are input, and turns off the power switch when the sawtooth wave signal reaches the duty control signal.

The switch controller further includes a zero current detection unit that detects the time point at which no more current flows to the power transfer device, and controls the PWM controller to turn on the power switch after a delay of a predetermined time period from the detected time point.

The power transfer device is an inductor, and includes a detection inductor electrically connected to the inductor with a predetermined turn ratio, and the zero current detection unit detects a time point at which a voltage applied to the detection inductor is lower than a predetermined voltage as the time point at which no more current flow to the power transfer device.

In cases in which the error amplifier may be a voltage amplifier, and the gain compensator includes a first resistor of which respective ends are connected to the output terminal and a first input terminal of the error amplifier, a first capacitor of which respective ends are connected to the output terminal and the first input terminal of the error amplifier, and a second resistor and a second capacitor of which a first end is connected to a first end of the second resistor. The second resistor and the second capacitor are connected between the output terminal and the first input terminal of the error amplifier, the reference signal is input to a second input terminal of the error amplifier, and the output signal is input to the first input terminal of the error amplifier.

As described, according to the present invention, a switch controller that generates a reference voltage according to an input voltage by adding a simple configuration and a converter having the same are provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Figure 1:
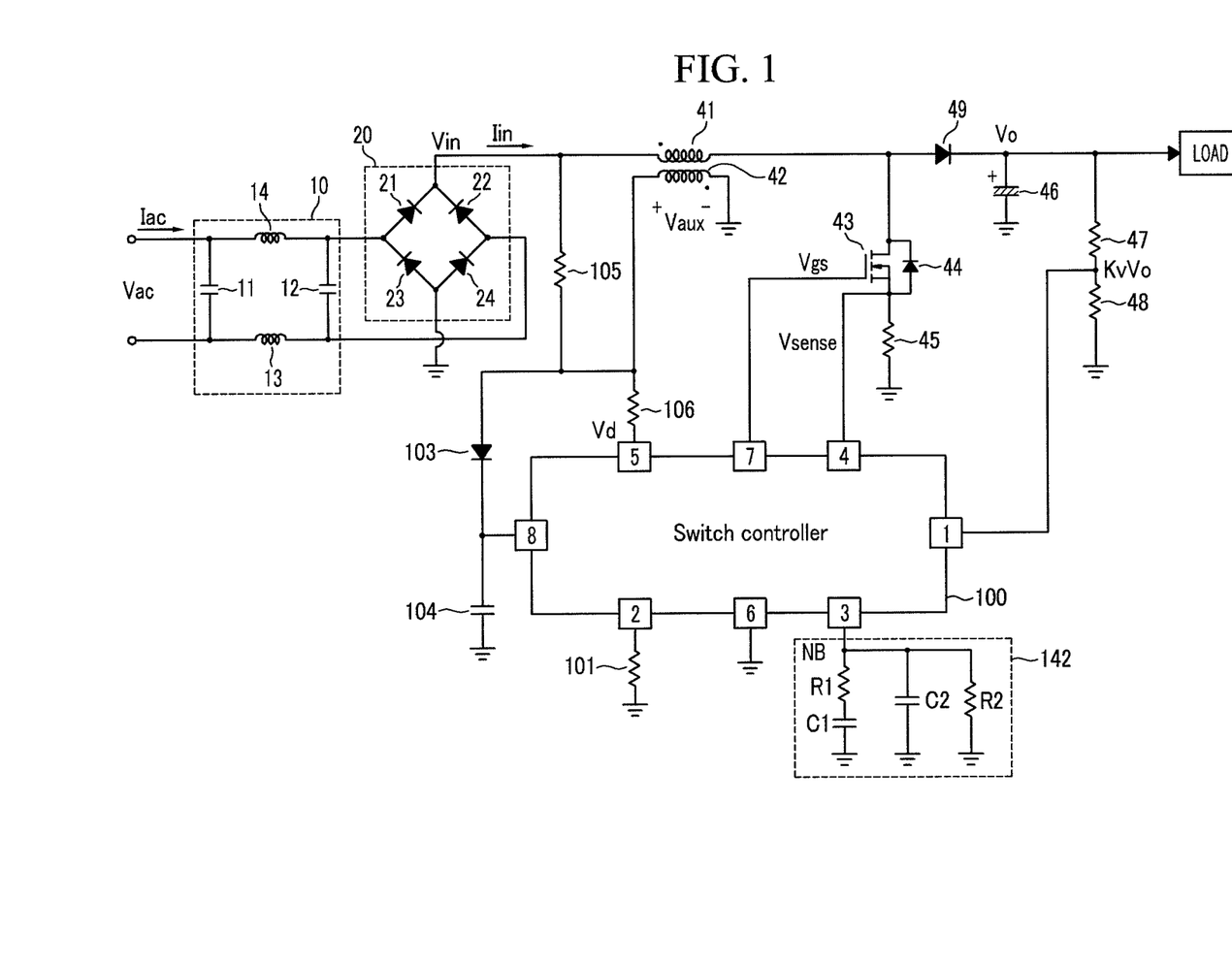
FIG. 1 shows a converter according to an exemplary embodiment of the present invention.

FIG. 1 shows a converter according to an exemplary embodiment of the present invention.

The converter includes an input filter 10, a bridge diode 20, an inductor 41, a power switch 43, a capacitor 46, a sensing resistor 45, a detecting inductor 42, a diode 49, output voltage dividing resistors 47 and 48, and a switch controller 100. In the power switch 43, a body diode 44 is formed in parallel.

The input filter 10 is formed of capacitors 11 and 12 and inductors 13 and 14, and removes noise components of an input AC voltage Vac and an input AC current Iac. The capacitor 11 and capacitor 12 are connected in parallel, the inductor 13 is connected between a first end of the capacitor 11 and a first end of the capacitor 12, and the inductor 14 is connected between a second end of the capacitor 11 and a second end of the capacitor 12.

The bridge diode 20 is formed of four diodes 21 to 24, and performs full-wave rectification on the input AC voltage Vac and the input AC current Iac to generate an input voltage Vin and an input current Iin.

As a power transmission device, the inductor 41 stores energy during a turn-on period of the power switch 43, and supplies the energy stored therein and an input voltage to an output end through the diode 49 when the power switch 43 is turned off. A first end of the inductor 41 is connected to an output end of the bridge diode 20, and a second end thereof is connected to a master switch 43 and an anode of the diode 49.

An auxiliary inductor 42 has a predetermined turn ratio with respect to the inductor 41. When a winding number of the inductor 41 is set to N and a winding number of the auxiliary inductor 42 is set to 1, the predetermined turn ratio becomes 1/N. A voltage applied to the inductor 41 is changed according to the turn ratio and then applied to the inductor 42 as an auxiliary winding voltage Vaux. The auxiliary winding voltage Vaux applied to the auxiliary inductor 42 is used to control a zero current switching operation and supply a voltage required for operation of the switch controller 100. The zero current switching operation will be described later.

The power switch 43 is formed as an n-channel metal oxide semiconductor field effect transistor (NMOSFET), and is turned on/off according to a gate control signal Vgs of the switch controller 100. A drain electrode of the power switch 43 is connected to the anode of the diode 49 and the second end of the inductor 41, and a source electrode thereof is connected to a first end of the sensing resistor 45. A second end of the sensing resistor 45 is grounded. A voltage Vsense at the first end of the sensing resistor 45 is used for the switch controller 100 to sense an overcurrent flowing to the power switch. The power switch 43 is turned on by a high-level gate control signal Vgs, and is turned off by a low-level gate control signal Vgs. Since the sense voltage Vsense is generated when the current flowing by the turn-on of the power switch 43 flows to the sensing voltage 45, a waveform of the current flowing to the power switch 43 is the same as that of the sense voltage Vsense.

A cathode of the diode 49 is connected to a first end of the capacitor 46. When the power switch 43 is turned off, the current flowing to the inductor 41 flows to the diode 49. The current flowing to the inductor 41 is the same as the input current Iin. The input current Iin is supplied to the capacitor 46 and a load LOAD.

While the input current Iin flowing through the diode 49, the capacitor 46 is charged by a part of the input current Iin. When the diode 49 is turned off and discharged during a period in which the input current Iin does not flow, power is supplied to the load LOAD.

The output voltage dividing resistors 47 and 48 voltage-divide an output voltage Vout to generate a voltage KvVo.

The switch controller 100 includes connection terminals 1 to 8, respectively realized by eight pins. The voltage KvVo is input to the connection terminal 1, and the connection terminal 2 is connected to a resistor 101. The resistor 101 is used for the switch controller 100 to generate a sawtooth wave, and the sawtooth wave is used to determine a turn-off time of the power switch 43. This will be described later. A gain compensator 142 is connected to the connection terminal 3. The gain compensator 142 may be included in the switch controller 100, or may be externally provided and connected to the switch controller 100 through the connection terminal 3. The gain compensator 142 will be described later with reference to FIG. 2. The sense voltage Vsense is input to the connection terminal 4, and the detection voltage Vd is input to the connection terminal 5. A power source voltage Vcc that is required for operation of the switch controller 100 is supplied to the connection terminal 8. A cathode of a diode 103 and a first electrode of a capacitor 104 are connected to the connection terminal 8. A second electrode of the capacitor 104 is grounded, an anode of the diode 103 is connected to a first electrode of a resistor 105, and a second electrode of the resistor 105 is connected to an output end of the bridge diode 20. A resistor 106 is connected between the auxiliary inductor 42 and the connection terminal 5. Since the input current Iin flows only to the output end during a predetermined period at an initial operation stage of the converter, the auxiliary inductor 42 does not generate a current. Thus, a voltage for operating the switch controller 100 cannot be supplied. In this case, the input current Iin is partially supplied to the capacitor 104 through the diode 103 via the resistor 105, and a predetermined voltage is charged to the capacitor 104. In this way, the power source voltage Vcc is supplied to the switch controller 100 for initial operation of the converter. When the operation of the converter is normalized, the current flowing to the inductor 42 is transmitted to the capacitor 104 through the diode 103. In this case, the voltage charged to the capacitor 104 becomes the power source voltage Vcc. The gate control signal Vgs is output through the connection terminal 7, and the connection terminal 6 is grounded.

Hereinafter, the switch controller 100 according to the exemplary embodiment of the present invention will be described in further detail with reference to FIG. 2.

Figure 2:
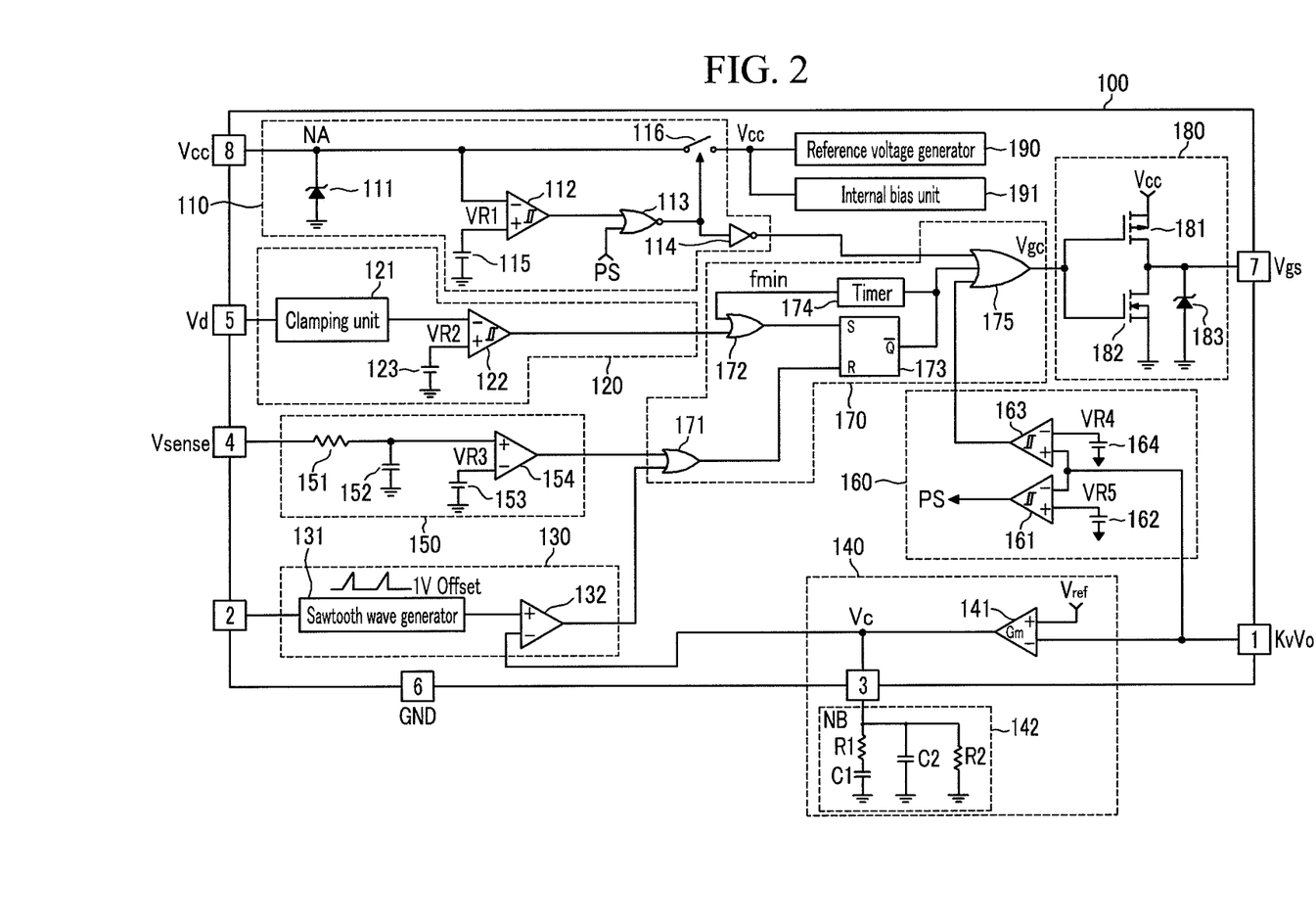
FIG. 2 shows a switch controller according to the exemplary embodiment of the present invention.

FIG. 2 shows the switch controller 100 according to the exemplary embodiment of the present invention.

The switch controller 100 includes an undervoltage lockout (hereinafter, referred to as UVLO) 110, a zero current detecting unit 120, a duty determining unit 130, a feedback information generator 140, an overcurrent detecting unit 150, a first protection circuit unit 160, a PWM controller 170, a gate driver 180, a reference voltage generator 190, and an internal bias unit 191.

The UVLO 110 stops the switching operation of the power switch 43 to prevent malfunction of the switch controller 100 and disconnects the power source voltage Vcc when the power source voltage Vcc is lower than a predetermined level. The UVLO 110 compares the power source voltage Vcc input through the connection terminal 8 with a first reference range VR1, and when the power source voltage Vcc is lower than the first reference range VR1, interrupts the switching operation of the power switch 43 and disconnects the power source voltage Vcc. The first reference range VR1 has a minimum voltage value for stable operation of the switch controller 100. Then, malfunction of the switch controller 100 can be prevented. The UVLO 110 includes a Zener diode 111, a hysteresis comparator 112, a NOR gate 113, an inverter 114, a reference voltage source 115, and a disconnection switch 116. An anode of the Zener diode 111 is grounded, and a cathode thereof is connected to the connection terminal 8. When the power source voltage Vcc is greater than a breakdown voltage of the Zener diode 111, a voltage at a node NA is clamped to the breakdown voltage. Then, damage to the switch controller 100 due to overvoltage of the power source voltage Vcc can be prevented. The hysteresis comparator 112 receives the power source voltage Vcc and a reference voltage of the reference voltage source 115, and determines whether the power source voltage Vcc is within a normal operation range of the switch controller 100. The hysteresis comparator 112 compares the first reference range VR1 in a predetermined range with reference to the reference voltage input to a non-inversion terminal (+) with the power source voltage Vcc input to an inversion terminal (−) according to the hysteresis characteristic, and determines an output signal level according to a result of the comparison. When the power source voltage Vcc is lower than the minimum value of the first reference range VR1, the hysteresis comparator 112 outputs a high-level signal, when the power source voltage Vcc is higher than the maximum value of the first reference range VR1, it outputs a low-level signal, and when the first reference range VR1 is included in the first reference range VR1, it maintains a level of an output signal. That is, when the power source voltage Vcc is lower than the minimum value of the first reference range VR1, the power source voltage Vcc is determined to be a low voltage and thus the hysteresis comparator 112 turns off the power switch 43 and turns off the disconnection switch 116 to interrupt input of the power source voltage Vcc to the switch controller 100. In further detail, the disconnection switch 116 is turned on/off according to an output of the NOR gate 113. When the output of the NOR gate 113 is low level, the disconnection switch 116 is turned off, and when the output is high level, the NOR gate 113 is turned on. When the power source voltage Vcc is lower than the minimum value of the first reference range VR1, the hysteresis comparator 112 outputs a high-level signal and the NOR gate 113 transmits a low-level output signal to the disconnection switch 116 without regard to a level of an output signal PS of the first protection circuit unit 160. Then, the disconnection switch 116 is turned off so that transmission of the power source voltage Vcc is interrupted.

The zero current detecting unit 120 receives a detection voltage Vd and detects a zero time point of a current is flowing to the inductor 41 by using the detection voltage Vd to determine a turn-on time of the power switch 43. When the power switch 43 is turned off, the current of the inductor 41 flows to the diode 49 and is supplied to the capacitor 46 and the load. When no more current flows to the inductor 41, a resonance is generated between the inductor 41 and a parasitic capacitance component of the turned-off power switch 43. Then, a voltage at both ends of the inductor 41 has a resonance waveform, and the detection voltage Vd has a value that is the product of the voltage at both ends of the inductor 41 and the turn ratio. In this case, the zero current detecting unit 120 senses the detection voltage Vd and determines a time point at which the detection voltage Vd becomes lower than a predetermined voltage to be a time point at which no more current flows to the inductor 41. When the time point at which no more current flows to the inductor 41 is determined, the zero current detecting unit 120 outputs a signal for turning on the power switch 43 at a time point after a delay of a predetermined time period from the time point at which no more current flows to the inductor 41. In order to reduce a switching loss of the power switch 43, the power switch 43 should be turned on when a voltage at both ends of the power switch 43 reaches the lowest level. In order to detect the lowest level of the voltage at both ends of the power switch 43, the zero current detecting unit 120 detects the time point at which no more current flows to the inductor 41. That is, the zero current detecting unit 120 compares the detection voltage Vd with a predetermined reference value, detects the time point at which no more current flowing to the inductor 41 (hereinafter referred to as a zero current time point), and controls the PWM controller 170 to turn on the power switch 43 when the voltage at both ends of the power switch 43 reaches the lowest level (hereinafter referred to as a lowest voltage time point) after a predetermined time delay from the zero current time point. In this case, the predetermined time delay can be realized by transmission delay of the switch controller 100. If a delay time period that is longer than the transmission delay is required, the switch controller 100 may further include a delay unit for generating additional delay. Since the converter determines how long the lowest voltage time point of both ends of the power switch 43 is delayed from the zero current time point, the converter according to the exemplary embodiment of the present invention may further include a delay unit according to a required delay time period. In this case, the delay unit should delay an output signal of a hysteresis comparator 122 in order to turn on the power switch at the lowest voltage time point in consideration of the transmission delay. It is well-known that the delay unit can be realized by using a resistor or a capacitor.

The zero current detecting unit 120 includes a clamping unit 121, a hysteresis comparator 122, and a reference voltage source 123. The clamping unit 121 controls a voltage range of the detection voltage Vd to be included within a predetermined range. In further detail, the clamping unit 121 controls the voltage range of the detection voltage Vd to prevent damage to a component of the zero current detection unit 120 when a detection voltage Vd included in an excessively low negative voltage range or an excessively high positive voltage range is input. With reference to a reference voltage supplied by the reference voltage source 123, when the detection voltage Vd is lower than a predetermined second reference range VR2, the hysteresis comparator 122 generates a high-level signal, and when the detection voltage Vd is higher than the second reference range VR2, the hysteresis comparator 122 generates a low-level signal. When the detection voltage Vd is included within the second reference range VR2, the hysteresis comparator 122 maintains a current output signal. The second reference range VR2 is a range for detecting a time point at which the current flowing to the inductor 41 becomes zero, and can be set in advance. As described, the zero current detecting unit 120 outputs a signal that is generated according to a result of comparison between the detection voltage Vd and the second reference range VR2 to the PWM controller 170.

The duty determining unit 130 compares a signal Vc corresponding to an output voltage with a predetermined reference signal to determine a duty of the power switch 43. The predetermined reference signal according to the exemplary embodiment of the present invention is a sawtooth signal, but the present invention is not limited thereto. The duty determining unit 130 includes a sawtooth wave generator 131 and a comparator 132. The sawtooth wave generator 131 includes a current source (not shown), and generates a sawtooth wave SW by using the resistor 101 and the current source. The resistor 101 is connected to the connection terminal 2 which is formed as a chip. In further detail, when a current of the current source flows to the resistor 101, a sawtooth wave SW that increases with a constant slope is generated. The sawtooth wave SW is a voltage signal having a constant period and duty with reference to a predetermined offset voltage. The comparator 132 includes an inversion terminal (−) and a non-inversion terminal (+), and determines a level of an output signal by comparing a signal input to the inversion terminal (−) and a signal input to the non-inversion terminal (+). Therefore, the comparator 132 compares a duty control signal Vc with the sawtooth wave SW, and outputs a high-level signal when the sawtooth wave SW is higher than the duty control signal Vc and outputs a low-level signal when the sawtooth wave SW is lower than the duty control signal Vc. When the comparator 132 outputs a high-level signal, the PWM controller 170 outputs a high-level signal so that the gate control signal Vgs becomes low level and the power switch 43 is turned off.

The feedback information generator 140 receives the voltage KvVo corresponding to the output voltage and generates feedback information for determining the duty of the power switch 43. The feedback information generator 140 includes an error amplifier 141 and the gain compensator 142. The gain compensator 142 according to the exemplary embodiment of the present invention is provided outside of the switch controller 100 through the connection terminal 31 but the present invention is not limited thereto. If the switch controller 100 is realized as a single chip, the gain compensator 142 may be provided inside the switch controller 100. The error amplifier 141 receives a reference voltage Vref through a non-inversion terminal (+) thereof, and receives the voltage KvVo generated by being resistor-divided from the output voltage Vout through an inversion terminal (−). The error amplifier 141 amplifies a current signal that corresponds to a difference between the reference voltage Vref and the voltage KvVo by a predetermined gain Gm to generate an output signal. The gain compensator 142 compensates a DC gain of the output signal of the error amplifier 141. The gain compensator 142 includes resistors R1 and R2 and capacitors C1 and C2. A first end of the resistor R1 and a first end of the capacitor C1 are connected in series, a second end of the capacitor C1 is grounded, and a second end of the resistor R1 is connected to a node NB. The resistor R2 and the capacitor C2 are respectively connected between the node NB and the ground. The gain compensator 142 compensates a DC gain component of a feedback transfer function gain for an input and output of the feedback information generator 140 to control a DC gain of the feedback transfer function to have a constant value. The feedback transfer function may further include a pole located in a low frequency band by the resistor R2 of the gain compensator 142. The DC gain of the feedback transfer function has a constant value by the pole. That is, the DC gain is determined by the resistor R2. In a conventional converter, a DC component of a feedback transfer function is unlimited, and therefore an output voltage is determined by a reference voltage Vref. That is, an output voltage Vout is determined according to a reference voltage Vref having a constant value, and therefore the conventional converter operates to supply a constant output voltage without regard to an input voltage. According to the exemplary embodiment of the present invention, operation of the converter is controlled by compensating the DC gain component of the feedback transfer function with a constant value in order to control an output voltage to be changed according to an input voltage. Accordingly, efficiency of the converter can be increased. The feedback transfer function is a function for a relationship between a duty control signal Vc and an output voltage Vo in order to determine a duty of the power switch 43. That is, an input of the feedback transfer function is the output voltage Vo and an output thereof is the duty control signal Vc. A configuration and operation of which the output voltage Vo changes according to the input voltage Vin based on compensation of the DC gain of the feedback transfer function will be described with reference to FIG. 3 and FIG. 4.

The PWM controller 170 includes OR gates 171, 172, and 175, an SR latch 173, and a timer 174. The PWM controller 170 receives output signals of the UVLO 110, the zero current detecting unit 120, the duty determining unit 130, the first protection circuit unit 160, and the second protection circuit unit 150, and generates and outputs a gate driver control signal Vgc for controlling switching operation of the power switch 43. The timer 174 forcibly turns on the power switch 43 if the power switch 43 is not turned on for more than a predetermined time period in order to prevent the switching operation of the power switch 43 from being controlled with lower than a predetermined minimum switching frequency (maximum switching period). In further detail, the timer 174 is synchronized at the end of the maximum switching period and generates a high-level on-time pulse signal fmin to turn on the power switch 43 if an output signal of an inversion output terminal $\overline{Q}$ of the SR latch 173 does not become low level again within the maximum switching period from a time at which the output signal was low level for turning on the power switch 43, and outputs the high-level on-time pulse signal fmin to the OR gate 172. Then, the high-level signal is input to a set terminal S of the SR latch 173 so that a low-level signal is output to the inversion output terminal $\overline{Q}$. The OR gate 171 outputs a high-level signal if one of the second protection circuit unit 150 and the duty determining unit 140 outputs a high-level signal. Then, the high-level signal is input to a reset terminal R of the SR latch 173 so that SR latch 173 outputs a high-level signal to the OR gate 175 through the inversion output terminal $\overline{Q}$. The OR gate 172 receives the on-time pulse signal fmin of the timer 174 and the output signal of the zero current detecting unit 120, and outputs a high-level signal if one of the two input signals is high level. Then, a high-level signal is input to the set terminal S of the SR latch 173 so that the SR latch 173 outputs a low-level signal to the OR gate 175 through the inversion output terminal $\overline{Q}$. When receiving a high-level signal through the set terminal S, the SR latch 173 outputs a low-level signal to the inversion output terminal $\overline{Q}$, and when receiving a high-level signal through the reset terminal R, the SR latch 173 outputs a high-level signal to the inversion terminal $\overline{Q}$. When both of the set terminal S and the reset terminal R receive a low-level signal, the current output level is maintained. The OR gate 175 receives the output signal of the UVLO 110, the output signal of the first protection circuit unit 160, and the output signal of the SR latch 173, and generates the gate driver control signal Vgc. The OR gate 175 outputs a high-level gate driver control signal Vgc when at least one of the input signals is high level, and outputs a low-level gate driver control signal Vgc when all the input signals are low level.

The gate driver 180 includes a PMOSFET 181, an NMOSFET 182, and a zener diode 183 for clamping the gate control signal Vgs. The gate driver 180 outputs a high-level voltage Vcc of a low-level (i.e., ground voltage) gate control signal Vgs according to the gate driver control signal Vgc. The voltage Vcc is applied to a source electrode of the PMOSFET 181, and a drain electrode thereof is connected to a drain electrode of the NMOSFET 182. A source electrode of the NMOSFET 182 is grounded, and gate electrodes of the PMOSFET 181 and the NMOSFET 182 are applied with the gate driver control signal Vgc. Therefore, when the low-level gate driver control signal Vgc is input to the gate driver 180, the gate driver 180 outputs a high-level gate control signal Vgs, and when the high-level gate driver control signal Vgc is input to the gate driver 180, the gate driver 180 outputs a low-level gate control signal (Vgs) of the ground level. A cathode electrode of the zener diode 183 is connected to the connection terminal 8 and an anode electrode of the zener diode 183 is grounded.

When the voltage KvVo that is resistor-divided from the output voltage Vout is too low or too high, the first protection circuit unit 16 determines that an error occurs in the converter and controls the power switch 43 to stop the switching operation. The first protection circuit unit 160 includes hysteresis comparators 161 and 163 and reference voltage sources 162 and 164. The hysteresis comparator 163 outputs a high-level signal when the voltage KvVo is higher than a reference range VR4 according to the reference voltage source 164 so that the power switch 43 is turned off. This may occur when a load connected to the output end of the converter is small so that the output voltage is excessively high. In addition, the hysteresis comparator 161 outputs a high-level signal PS when the voltage KvVo is lower than a reference range VR5 according to the reference voltage source 162 so that the power switch 43 is turned off. When the signal PS is high level, an output of the NOR gate 113 becomes low level, and the inverter 114 inverts the low-level output to a high-level signal and transmits the high-level signal to the OR gate 175. Then, the gate driver 180 inputs a low-level signal to the power switch 43, and the power switch 43 is turned off.

This may occur when an overload is connected to the output end of the converter so that the output voltage is too low or when the output voltage is not sensed.

The second protection circuit unit 150 senses the sense voltage Vsense and determines that an overcurrent flows to the power switch 43 when the sense voltage Vsense is higher than a predetermined voltage, and turns off the power switch 43 to protect the power switch 43. The second protection circuit unit 150 includes a resistor 151, a capacitor 152, a reference voltage source 153, and a comparator 154. The comparator 154 compares a voltage VR3 supplied to an inversion terminal (−) from the reference voltage source 153 with the sense voltage Vsense input to a non-inversion terminal (+), and transmits a high-level signal to the OR gate 171 of the PWM controller 170 when the sense voltage Vsense is higher than the voltage VR3. Then, the OR gate 171 outputs a high-level signal to the reset terminal of the SR latch 173, and the SR latch 173 outputs a high-level signal to the OR gate 175. Then, the gate driver 180 outputs a low-level gate control signal to turn off the power switch 43.

The reference voltage generator 190 receives the power source voltage Vcc and converts the power source voltage Vcc to a proper level of voltage to provide a reference voltage of the switch controller 100. The internal bias unit 191 receives the power source voltage Vcc and supplies a bias voltage that is required for operation of the switch controller 100.

Hereinafter, a control loop and a function of the gain compensator 142 of the converter according to the exemplary embodiment of the present invention will be described in further detail with reference to FIG. 3.

Figure 3:
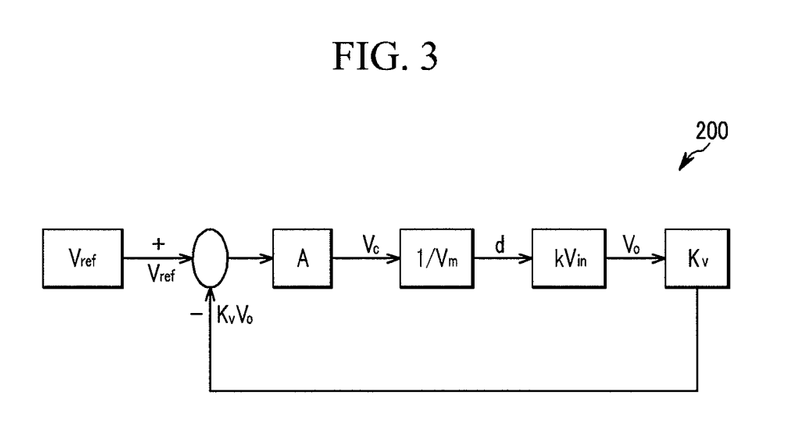
FIG. 3 is a block diagram of a control loop of a converter according to the exemplary embodiment of the present invention.

FIG. 3 is a block diagram of a control loop 200 of the converter according to the exemplary embodiment of the present invention. The control loop 200 shows a method for controlling an output voltage of the converter according to an input voltage. The control loop 200 includes a feedback transfer function gain A of the feedback information generator 140, an inverse number 1/Vm of a peak value Vm of the sawtooth wave SW, a transfer function gain kVin of a plant, and a resistor-divided gain Kv. The plant refers to a substantial configuration that generates an output voltage Vo by using an input voltage Vin. In the exemplary embodiment of the present invention, the inductor 41, the power switch 43, the diode 49, and the capacitor 46 form the plant. The plant may vary according to a type of converter, but the transfer function gain of the plant is proportional to the input voltage Vin without regard to the type of converter. The resistor-divided gain Kv corresponds to a ratio of an output voltage divided by the resistors 47 and 48.

First, when an output voltage KvVo that is divided according to the resistor-divided gain Kv is input to the feedback information generator 140, a difference between the reference voltage Vref and the divided output voltage KvVo is amplified to a feedback transfer function gain A having a constant DC gain through the error amplifier 141 and the gain compensator 142. The amplified voltage difference is input as a duty control signal Vc to the duty determining unit 130. The sawtooth wave SW of the duty determining unit 130 is input to a non-inversion terminal (+) of the comparator 132, and the duty control signal Vc is input to an inversion terminal (−) of the comparator 132. Then, the power switch 43 is turned off at a time at which the sawtooth wave SW that is increasing with a constant slope reaches the duty control signal Vc. Therefore, a value Vc/Vm obtained by dividing the duty control signal Vc with the peak value Vm of the sawtooth wave SW becomes a duty of the power switch 43. The duty is a turn-on period of the power switch 43, and power is charged to the inductor 41 while the power switch 43 is turned on. The output voltage Vo is generated by transmitting power charged in the inductor 41 to the capacitor 46. Therefore, the output voltage Vout is determined by multiplying the transfer function gain kVin of the plant by the duty. This relationship can be given as Equation 1.

$$KvVo = \frac{AkVin}{Vm + AkVin} Vref \qquad \text{[Equation 1]}$$

For simplifying Equation 1, Equation 1 can be represented as Equation 2 if a loop gain T is set as given in Equation 2.

$$Vo = \frac{T}{1+T} \frac{Vref}{Kv} \qquad \text{[Equation 2]}$$
$$T = \frac{AkVin}{Vm}$$

In the case that a DC component of the feedback transfer function gain A of the feedback information generator 140 is unlimited as in the conventional converter, a DC gain of T/(1+T) (hereinafter referred to as an error term) is converged to 1 so that the output voltage Vo can be determined according to the reference voltage Vref.

However, according to the exemplary embodiment of the present invention, the DC gain component of the feedback transfer function gain A of the feedback information generator 140 is designed to have a constant value. Therefore, the loop gain T is decreased as an input voltage is decreased, and accordingly, a value of the error term is also decreased as the input voltage is decreased. In this case, the value of the error term is less than 1 (T/(1+T)<1). Accordingly, the output voltage Vo is determined to be a value that is lower than the reference voltage Vref. Since the output voltage is decreased according to the input voltage, the efficiency of the converter can be increased.

Figure 4:
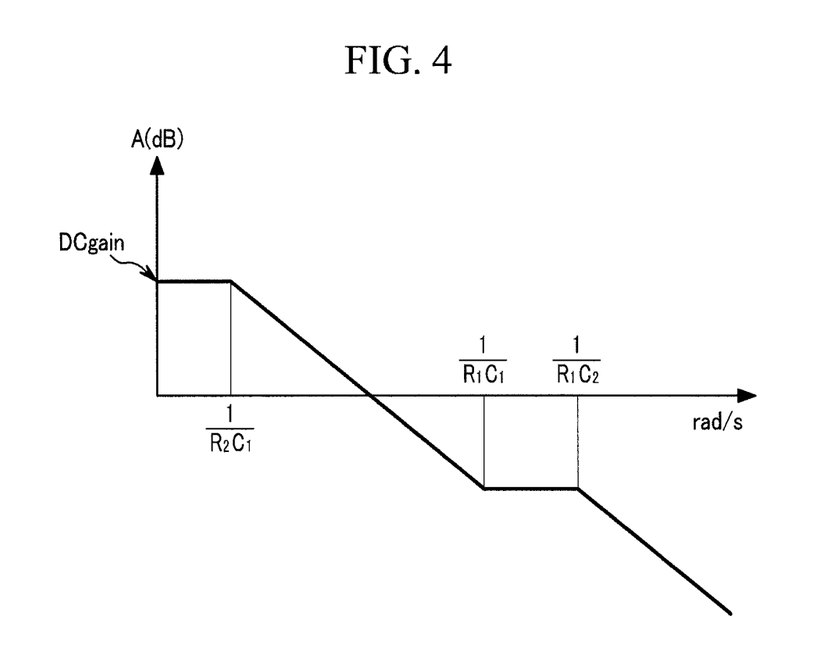
FIG. 4 is a graph for description of a feedback transfer function gain according to the exemplary embodiment of the present invention.

FIG. 4 shows a graph for describing the feedback transfer function gain A of the feedback information generator, compensated by the gain compensator 142.

As previously described, the gain compensator 142 includes the resistor R2 for maintaining the DC gain of the feedback transfer function at a constant level, the capacitor C2 connected in parallel with the resistor R2, the resistor R1, and the capacitor C1 connected in series between the resistor R1 and the ground. The value of the resistor R2 determines the DC gain in the gain compensator 142 according to the exemplary embodiment of the present invention. As shown in FIG. 4, the feedback transfer function gain A includes a pole according to the 1/R$_2$C$_1$, the other pole according to the 1/R$_1$C$_2$, and a zero according to the 1/R$_1$C$_1$. Therefore, as shown in FIG. 4, the DC gain has a constant value.

The error amplifier 141 of the feedback information generator 140 is described as a transconductance amplifier according to the exemplary embodiment of the present invention. The reference voltage Vref is input to the non-inversion terminal (+) of the error amplifier 141, and the divided output voltage KvVo is input to the inversion terminal (−) thereof. The error amplifier 140 amplifies a difference of the two voltages to generate an output current. The output current is input to the gain compensator 142 and becomes a duty control signal Vc by having a DC gain compensated by the gain compensator 142. However, the present invention is not limited thereto, and a feedback information generator 140' that includes an error amplifier 141' which is a voltage amplifier will be described with reference to FIG. 5. Other constituent elements excluding the feedback information generator 140' are the same as those of the previously described exemplary embodiment, and therefore no further description will be provided.

Figure 5:
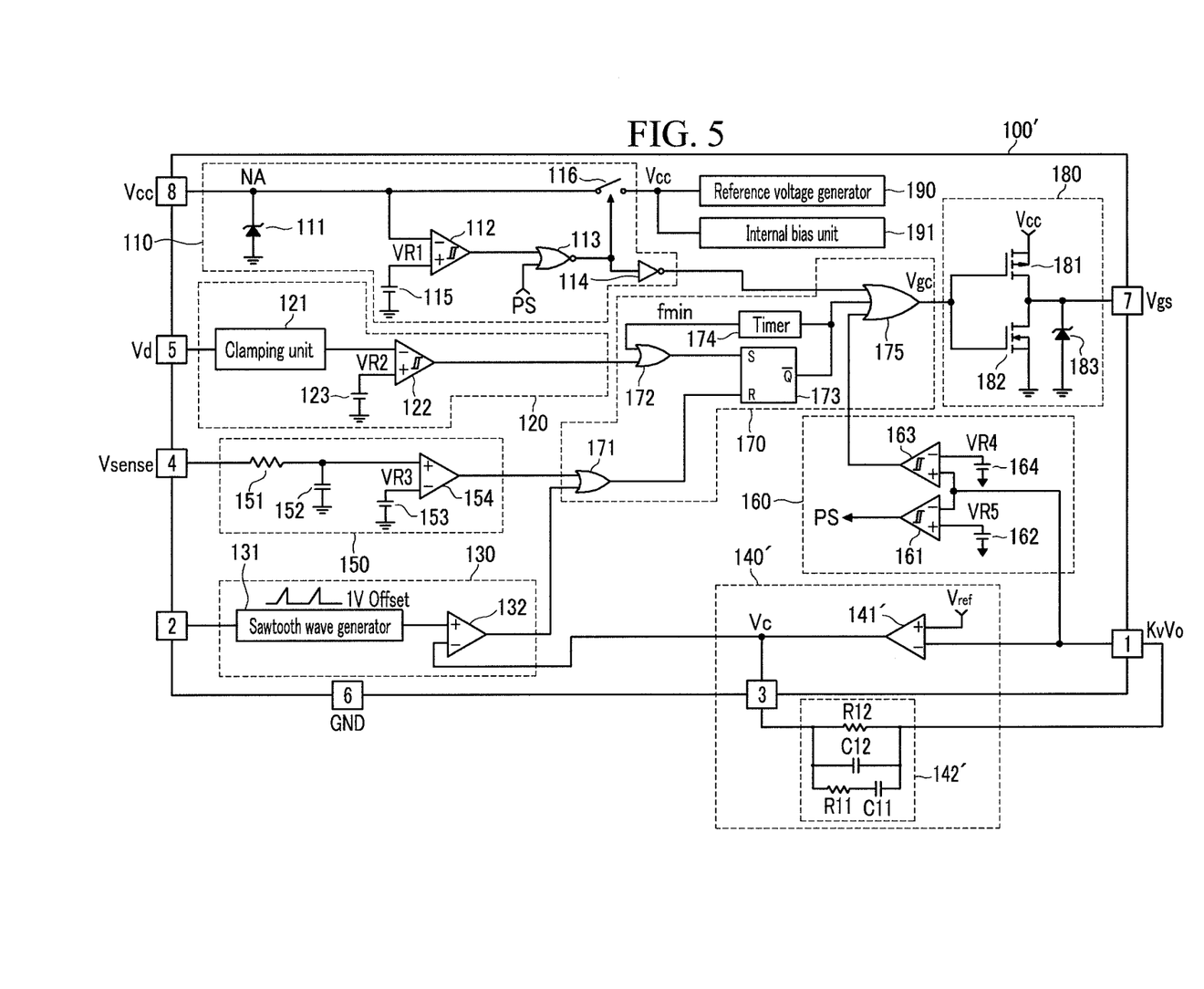
FIG. 5 shows a switch controller according to another exemplary embodiment of the present invention.

FIG. 5 shows a switch controller 100' according to another exemplary embodiment of the present invention.

As shown in FIG. 5, the feedback information generator 140' includes the error amplifier 141' which is a voltage amplifier, and a gain compensator 142'. The gain compensator 142' according to the current exemplary embodiment of the present invention is provided outside the switch controller 100' and is connected to a connection terminal 1 and a connection terminal 3, but the present invention is not limited thereto. If the switch controller 100' is realized as a single chip, the gain compensator 142' may be provided inside the switch controller 100'. A reference voltage Vref is input to a non-inversion terminal (+) of the error amplifier 141', and a voltage KvVo generated by being resistor-divided from an output voltage Vo is input to an inversion terminal (−) thereof. The error amplifier 141' amplifies a difference between the two voltages to generate an output voltage. The gain compensator 142' compensates a DC gain of the output signal of the error amplifier 141'. The gain compensator 142' includes resistors R11 and R12 and capacitors C11 and C12. The resistor R11 and the capacitor C11 are connected to the inversion terminal (−) and an output terminal of the error amplifier 141', respectively, through a connection terminal 1 and a connection terminal 3. The resistor R12 and the capacitor C12 are connected to the inversion terminal (−) and the output terminal of the error amplifier 141', respectively, through the connection terminal 1 and the connection terminal 3. The gain compensator 142' of the error amplifier 141' compensates a DC gain component of a feedback transfer function gain to control the DC gain of the feedback transfer function to have a constant value. The feedback transfer function further includes a pole positioned in a low frequency band by the resistor R12 of the gain compensator 142'. By this pole, the DC gain of the feedback transfer function has a constant value. That is, the DC gain is determined by the resistor 12.

Figure 6:
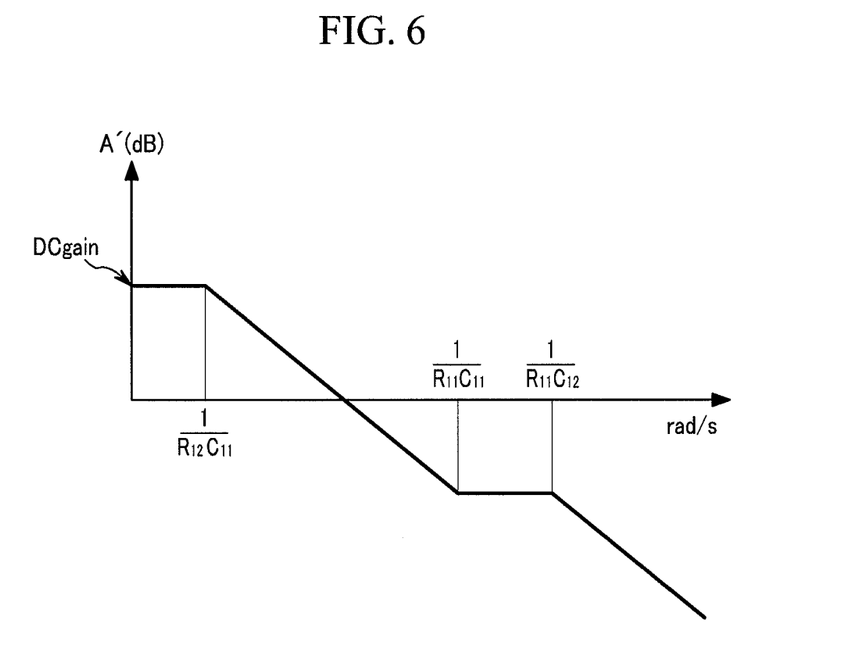
FIG. 6 is a graph for description of a feedback transfer function gain according to the other exemplary embodiment of the present invention.

FIG. 6 is a graph for description of a feedback transfer function gain A' of the feedback information generator 140', compensated by the gain compensator 142' according to the current exemplary embodiment of the present invention.

As shown in FIG. 6, the feedback transfer function gain A' includes a pole according to the $1/R_{12}C_{11}$, the other pole according to the to $1/R_{11}C_{12}$, and a zero according to the $1/R_{11}C_{11}$. Therefore, as shown in FIG. 6, the DC gain has a constant value.

Figure 7:
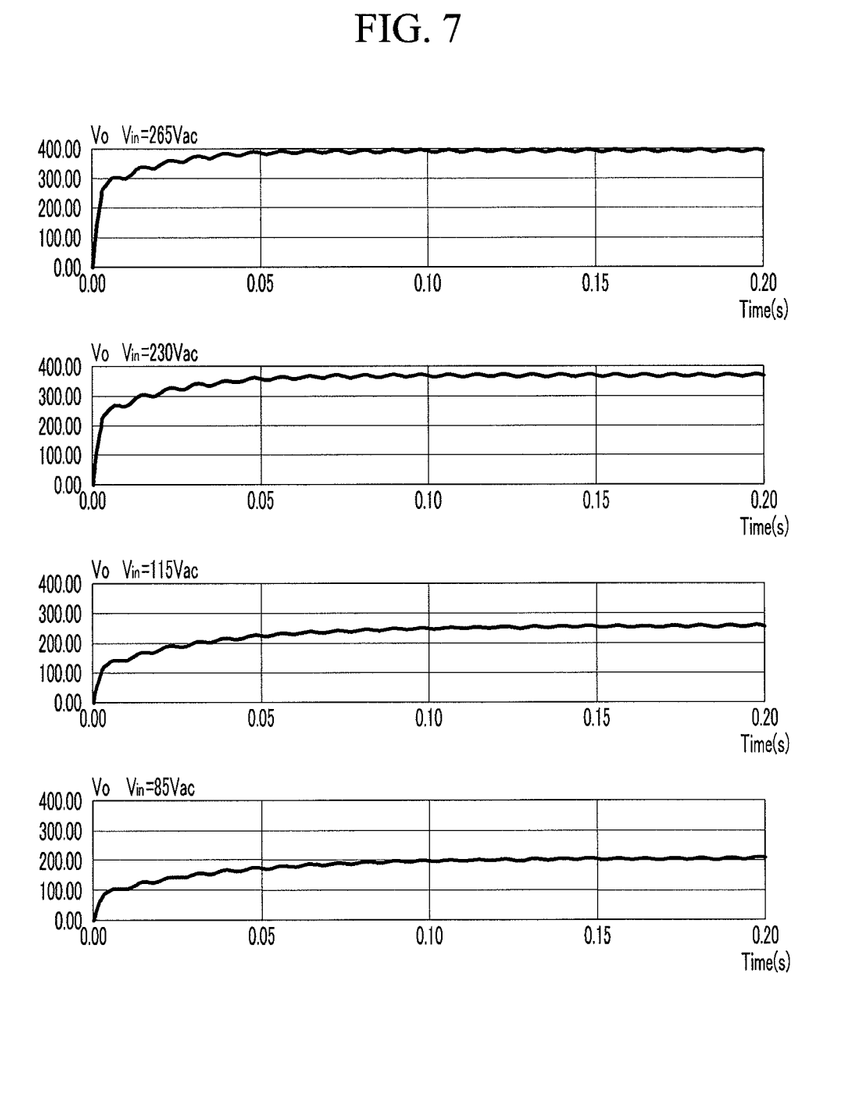
FIG. 7 shows output voltage waveforms according to an input voltage of the converter according to the exemplary embodiment of the present invention.

FIG. 7 shows waveforms of the output voltage Vo according to the input voltage Vin of the converter according to the exemplary embodiment of the present invention. As shown in FIG. 7, the output voltage Vo is decreased as the input voltage Vin is decreased.

As described, the switch controller 100 according to the exemplary embodiment of the present invention and the converter having the same maintains a constant DC gain by adding a simple-structured gain compensator, and accordingly, an output voltage is determined according to an input voltage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A switch controller that controls switching operation of a power switch that controls power transmission of a power transfer device that transmits input power to an output terminal, comprising:
   a feedback information generator configured to receive an output voltage detection signal corresponding to an output voltage according to power transmitted from the power transfer device, and to generate a duty control signal that corresponds to a difference between the output voltage detection signal and a reference signal for controlling the output voltage,
   wherein the feedback information generator comprises (1) an error amplifier configured to amplify a difference between the output voltage detection signal and the reference signal and (2) a gain compensator connected to an output terminal of the error amplifier, the gain compensator configured to compensate a DC gain of a feedback transfer function between the reference signal and the output voltage of the feedback information generator to have a constant value, the constant value of the DC gain enabling control of an output voltage according to an input voltage,
   wherein the gain compensator comprises (1) a first resistor connected to the output terminal of the error amplifier for determining the DC gain of the feedback transfer function and (2) a circuit element that includes at least one capacitor or resistor that extends in parallel to the first resistor; and
   a duty determining unit configured to generate information for determining turn-on/off of the power switch by using the duty control signal.

2. The switch controller of claim 1, wherein the error amplifier is a transconductance amplifier, and
   the gain compensator comprises:
   a first capacitor having a first end connected to a second end of the first resistor and a second end being grounded;
   a second capacitor having a first end connected to the first end of the first resistor and a second end being grounded; and
   a second resistor having a first end connected to the first end of the first resistor and a second end being grounded.

3. The switch controller of claim 1, wherein the error amplifier is a voltage amplifier, wherein the first resistor has respective ends connected to the output terminal and a first input terminal of the error amplifier, and
   the gain compensator comprises:
   a first capacitor of which respective ends are connected to the output terminal and the first input terminal of the error amplifier, and
   a second resistor and a second capacitor of which a first end is connected to a first end of the second resistor, and
   the second resistor and the second capacitor are connected between the output terminal and the first input terminal of the error amplifier, the reference signal is input to a second input terminal of the error amplifier, and the output signal is input to the first input terminal of the error amplifier.

4. The switch controller of claim 1, further comprising a PWM controller that turns on the power switch according to a time point at which no more current flows to the power transfer device, wherein the PWM controller turns off the power switch according to information input from the duty determining unit.

5. The switch controller of claim 4, wherein the duty determining unit comprises a sawtooth wave generator that generates a sawtooth wave signal having a predetermined period and a comparator to which the duty control signal and the sawtooth wave signal are input, and turns off the power switch when the sawtooth wave signal reaches the duty control signal.

6. The switch controller of claim 4, further comprising a zero current detection unit that detects the time point at which no more current flows to the power transfer device, and controls the PWM controller to turn on the power switch after a delay of a predetermined time period from the detected time point.

7. A converter comprising:
a power transfer device configured to transmit input power to an output terminal as output power;
a power switch connected to a first end of the power transfer device and configured to control power transmission of the power transfer device; and
a switch controller configured to control switching operation of the power switch,
wherein the switch controller comprises (1) a feedback information generator configured to receive an output voltage detection signal corresponding to an output voltage according to the power transmitted from the power transfer device and generate a duty control signal corresponding to a difference between the output voltage detection signal and a reference signal for controlling the output voltage, and
wherein the switch controller is configured to determine turn-on/off of the power switch by using the duty control signal,
wherein the feedback information generator comprises (1) an error amplifier configured to amplify a difference between the output voltage detection signal and the reference signal to generate a signal corresponding to the difference between the two signals and (2) a gain compensator connected to an output terminal of the error amplifier and configured to compensate a feedback transfer function between the reference signal and the output voltage to control a DC gain of the feedback transfer function to have a constant value, the constant value of the DC gain enabling control or an output voltage according to an input voltage,
wherein the gain compensator comprises (1) a first resistor connected to the output terminal of the error amplifier configured to determine the DC gain of the feedback transfer function and (2) a circuit element that includes at least one capacitor or resistor and that extends in parallel to the first resistor.

8. The converter of claim 7, wherein the switch controller comprises:
a duty determining unit that generates information for determining turn-on/off of the power switch by using the duty control signal.

9. The converter of claim 8, wherein the error amplifier is a transconductance amplifier, wherein the first resistor has a first end connected to the output terminal of the error amplifier, and
the gain compensator comprises:
a first capacitor having a first end connected to a second end of the first resistor and a second end being grounded;
a second capacitor having a first end connected to the first end of the first resistor and a second end being grounded; and
a second resistor having a first end connected to the first end of the first resistor and a second end being grounded.

10. The converter of claim 9, further comprising a PWM controller turning on the power switch according to a time point at which no more current flows to the power transfer device,
wherein the PWM controller turns off the power switch according to information input from the duty determining unit.

11. The converter of claim 10, wherein the duty determining unit comprises a sawtooth wave generator that generates a sawtooth wave signal having a predetermined period and a comparator to which the duty control signal and the sawtooth wave signal are input, and turns off the power switch when the sawtooth wave signal reaches the duty control signal.

12. The converter of claim 10, wherein the switch controller further comprises a zero current detection unit that detects the time point at which no more current flows to the power transfer device, and controls the PWM controller to turn on the power switch after a delay of a predetermined time period from the detected time point.

13. The converter of claim 12, wherein the power transfer device is an inductor, and comprises a detection inductor electrically connected to the inductor with a predetermined turn ratio, and the zero current detection unit detects a time point at which a voltage applied to the detection inductor is lower than a predetermined voltage as the time point at which no more current flows to the power transfer device.

14. The converter of claim 7, wherein the error amplifier is a voltage amplifier, wherein the first resistor has respective ends that are connected to the output terminal and a first input terminal of the error amplifier, and
the gain compensator comprises:
a first capacitor of which respective ends are connected to the output terminal and the first input terminal of the error amplifier; and
a second resistor and a second capacitor of which a first end is connected to a first end of the second resistor,
wherein the second resistor and the second capacitor are connected between the output terminal and the first input terminal of the error amplifier, the reference signal is input to a second input terminal of the error amplifier, and the output signal is input to the first input terminal of the error amplifier.

* * * * *

UNITED STATES PATENT AND TRADEMARK OFFICE
CERTIFICATE OF CORRECTION

| | |
|---|---|
| PATENT NO. | : 9,148,051 B2 |
| APPLICATION NO. | : 12/497261 |
| DATED | : September 29, 2015 |
| INVENTOR(S) | : Moon et al. |

It is certified that error appears in the above-identified patent and that said Letters Patent is hereby corrected as shown below:

In the claims:

Column 15,
Line 46, "control or an output" should read --control of an output--.

Signed and Sealed this
Twenty-first Day of June, 2016

Michelle K. Lee
*Director of the United States Patent and Trademark Office*